(No Model.)

W. D. ORCUTT.
ROTARY SOLE EDGE CUTTER.

No. 295,936. Patented Apr. 1, 1884.

Witnesses:
Walter E. Lombard.
E. A. Hemmenway.

Inventor:
William D. Orcutt
by N. C. Lombard
Attorney.

UNITED STATES PATENT OFFICE.

WILLIAM D. ORCUTT, OF BOSTON, MASSACHUSETTS, ASSIGNOR OF ONE-HALF TO JAMES H. BUSELL, OF SAME PLACE.

ROTARY SOLE-EDGE CUTTER.

SPECIFICATION forming part of Letters Patent No. 295,936, dated April 1, 1884.

Application filed April 7, 1882. (No model.)

*To all whom it may concern:*

Be it known that I, WILLIAM D. ORCUTT, a citizen of the United States, residing at Boston, in the county of Suffolk and State of Massachusetts, have invented an Improvement in Rotary Cutters for Trimming Sole-Edges; and I do hereby declare the same to be fully described in the following specification and represented in the accompanying drawings.

My invention is an improvement upon the rotary sole-edge cutter shown in my Patent No. 238,303, March 1, 1881; and it consists in a rotary cutter for trimming sole-edges, the teeth of which are formed, as described in that patent, each with a flat front face and with its top or outer end molded the counterpart of the sole-edge to be trimmed, and in all other respects substantially as described in that patent, except that the relative lengths of the radii at the cutting-edge and the radii back of the cutting-edge are so different as to make my present cutter a substantial and important improvement upon my cutter already patented, for the reason that while it retains all of the advantages of my patented cutter over other prior cutters for trimming sole-edges it has certain other advantages, fully described below.

The best method of manufacturing my improved cutter is to first turn a circular blank or disk so that its periphery shall be the counterpart of the sole-edge. Then form from this a many-sided blank, with as many sides as the finished cutter is to have teeth, the outline of its perimeter being also the counterpart of the sole-edge; then cut a series of grooves and finish the teeth, as will be more fully described.

Figure 3:
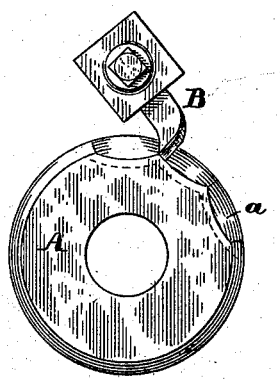
Figure 1:
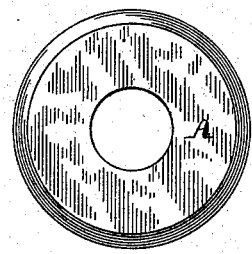
Figures 2, 4:
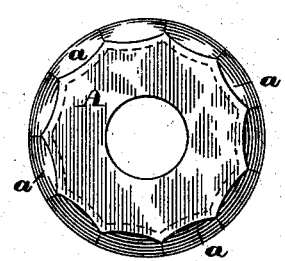
Figure 5:
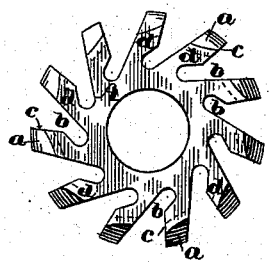
Figure 6:
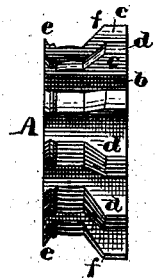
Figure 7:
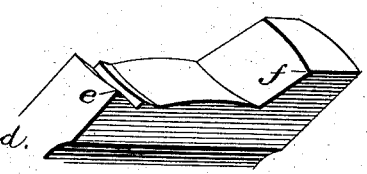

Figure 1 of the drawings is a side view, and Fig. 2 an edge view, of the steel blank after being turned. Fig. 3 illustrates the manner of forming the inwardly-curved sides upon the blank, and Fig. 4 is an end view of said blank after said sides have been formed; and Figs. 5 and 6 are respectively an end view and side elevation of the finished cutter. Fig. 7 is a perspective view of one of the teeth.

In the drawings, A is a steel hub or disk having its periphery turned to a true circle and molded as shown in Fig. 2. When the disk A has been turned as shown in Figs. 1 and 2, it is mounted upon a suitable mandrel or other support, so arranged that it may be intermittently moved about its axis, and also so that said disk may be moved toward and from a rotary cutter, B, so that by the revolutions of said cutter B said disk may have formed upon its periphery a series of inwardly-curved sides, *a a*, as shown in Fig. 4. When the blank has been shaped as shown in Fig. 4, it is fed endwise beneath or past a suitably-shaped cutter, to cut the grooves *b b* through the same from side to side, as shown in Figs. 5 and 6. These grooves *b* are cut strongly inclined to the radii of the blank, as shown in Fig. 5, and the front *c* of the tooth is formed by widening the upper end of the groove *b*, as shown in Fig. 5, the inclination of the front face, *c*, being less than that of the groove *b*, for convenience of sharpening, and also to get the character of edge desired. The grooves form the teeth, and are so cut that the radii of the cutting-edge are longer than the corresponding radii of the rest of the tooth for clearance, and yet the radii of the tooth at its rear or heel are long enough to prevent too rank a cut, the heel of each tooth in this class of rotary cutters for sole-edge trimming acting as a guard to determine the rankness of cut. In my cutter already patented, the clearance is obtained by outwardly curving the top or outer end of each tooth from cutting-edge to heel, and it is desirable that the rear part or heel of each tooth should be left high enough to act as a guard; but when so left the clearance was necessarily slight at these parts of the outer ends of the teeth just a little back of the cutting-edge, to make the cutter likely to gum or become coated with a hard scale, much like the coating on a knife-blade used to cut tobacco. By removing segments from the disk—that is, making it many-sided, as shown in Fig. 4—the desired clearance is obtained, and the cutter can be made more or less rank, as desired, the maximum rankness being obtained with a certain width of slot, when one wall of the slot intersects one side of the polygon midway between its two ends, and the other wall intersects the polygon at the apex formed by the junction of two of its sides, and any less degree of rankness by causing the slot to cut away less of one side and more of the adjoining side of the polygonal blank. Moreover, when the radii of the tooth are radii of a polygon, (instead of radii of a circle whose center is at one side of the center of the blank from which the tooth was formed, as in my patent above mentioned,) the clearance of each tooth is diminished as the teeth are reduced in thickness by repeated grinding—that is, as the front face of each tooth is ground away in sharpening, the radii of the cutting-edge become more nearly equal in length to the radii of the heel of the tooth. When the cutter is first made, the difference in length between the radii of each tooth at its cutting-edge and the radii at the heel or back of the tooth determines both the clearance and the rankness of cut, and for the best results bear a certain relation to each other, which depends (as will be well understood by all familiar with the manufacture of rotary cutters for trimming sole-edges of this class) upon the degree of slant of the front face, $c$, of the tool, and the distance between the cutting-edge of one tooth and the angle at the heel of the next tooth. Now, this distance becomes greater, of course, from sharpening the cutter by grinding away its front face, $c$, and it is also true that the greater this width the less should be the difference in length between the radii at the cutting-edge and these at the guard or heel of the tooth for the best results.

One very important advantage is that as the several teeth are reduced in thickness by repeated grindings, the clearance of each tooth is also diminished—that is, the peripheral surface, near the heel of the tooth in all cutters of this class, acts as a guard to prevent the next tooth cutting too rank—and as the spaces between the teeth are widened by repeated grinding, it is important that the distance from the center of the cutter to any point on the cutting-edge of the tooth, (which is at the maximum when the cutter is new and the width of the space between the teeth at the minimum,) and which then bears a certain relation, for the best results, to the distance from the center of the cutter, and the corresponding point on the heel of the tooth should bear a different relation to that distance as the spaces grow wider, until, when the spaces are at their maximum width and the teeth at their minimum thickness, the clearance almost wholly disappears. This enables the cutter to be used until the teeth become too thin for further grinding without materially increasing the rankness of the cut, whereas, when the peripheral ends of the teeth are curved outwardly, but eccentric to the axis of the cutter, as heretofore practiced, the thin or partially worn-out blade would take as thick a chip, and often a thicker one, than the thicker tooth when the cutter was new.

From the above it will be seen that in the manufacture of rotary cutters for trimming sole-edges the teeth have been formed each with a flat front face, and with its outer end molded the counterpart of the sole-edge, as in my present cutter; but clearance was obtained by making the curves from cutting-edge to heel of each tooth slightly eccentric to the finished cutter. Samples of these sole-edge cutters are shown in my Patents No. 212,971, of 1879, and No. 238,303, of 1881. This mode of obtaining clearance was also old in gear and other metal-working cutters. (See patent to Brown No. 45,294, of 1864.) Another way of obtaining clearance in a gear-cutter is described in Crane's Patent No. 258,560, of 1882—namely, by giving each tooth the radii of a polygon; and therefore I do not broadly claim a rotary cutter in which the teeth have the radii of a polygon; but it is obvious that Crane's cutter has teeth radically different from mine, in that his teeth grow gradually narrower from the cutting-edge toward the heel; and, moreover, his method of manufacture is wholly inapplicable to the making of my cutter or any other cutter for trimming sole-edges. It is also the fact that in gear-cutters and other milling or metal-working cutters the heel of the tooth could perform no function as a guard, while in cutters for trimming sole-edges the heel must act as a guard. Consequently in the practical manufacture of sole-edge cutters prior to my present invention there has been a conflict between these elements, the clearance necessary to prevent gumming, the height of heel necessary to prevent too great rankness of cut, and the slant of the front face, for as it was essential to give clearance enough to prevent gumming, this necessarily so shortened the radii at the heel of the tooth as to make the cutter too rank, unless the slant of the front face was carefully adapted to the other two conditions, and when this was done the cutter acted somewhat as a scraper, rather than a cutter proper.

My present cutter, by reason of the radii of its teeth being those of a polygon, can obviously be formed with amply sufficient clearance to prevent gumming, and yet with either the minimum or maximum or any intermediate degree of rankness, and consequently the slant of the front face may be more or less, so that the slant can be so decided as to make the cutting-edge keen enough to suit those who insist that there should be absolutely nothing of the scraper feature in a sole-edge cutter, or the slant be such as to suit those who insist that such a cutter should be rather a scraper than a cutter, as well as all intermediates between these extremes, the rankness varying with the degree of slant—that is, with the keenness of the cutting-edge—a cutter with a very keen cutting-edge requiring to be less rank than when the cutting-edge is not so keen. Neither of these two features— slant of the front face or keenness of edge and heel acting as a guard—enters into the construction of cutters for metal working, while both are of vital importance in cutters for trimming sole-edges, and I am, so far as I have any reason to believe, the first to make a cutter for sole-edges in which the radii of the teeth were radii of a polygon, and in which consequently the clearance and rankness are not interdependent, and neither has any connection with the slant of the front face.

What I claim as my invention is—

The improved cutter for trimming sole-edges above described, having a series of teeth, each of which has not only a flat front face, $c$, and is molded on its outer end the counterpart of the sole-edge, so that its heel acts as a guard, but each also has the radii of a polygon, whereby both the desired clearance and rankness can be obtained, as set forth.

Executed at Boston, Massachusetts, this 5th day of April, A. D. 1882.

WILLIAM D. ORCUTT.

Witnesses:
E. A. HEMMENWAY,
WALTER E. LOMBARD.